US008553881B2

(12) United States Patent
Lee et al.

(10) Patent No.: US 8,553,881 B2
(45) Date of Patent: Oct. 8, 2013

(54) COMPOSITE MASKING SYSTEM AND METHOD FOR IMPROVING INVISIBILITY OF HIGH-DEFINITION VIDEO WATERMARKING

(75) Inventors: Heung Kyu Lee, Daejeon (KR); Tae Woo Oh, Daejeon (KR); Kyung Su Kim, Daejeon (KR); Ji Won Lee, Daejeon (KR); Hee Dong Kim, Daejeon (KR)

(73) Assignee: Korea Advanced Institute of Science and Technology (KAIST), Daejeon (KR)

( * ) Notice: Subject to any disclaimer, the term of this patent is extended or adjusted under 35 U.S.C. 154(b) by 337 days.

(21) Appl. No.: 13/180,534

(22) Filed: Jul. 11, 2011

(65) Prior Publication Data

US 2012/0027207 A1 Feb. 2, 2012

(30) Foreign Application Priority Data

Jul. 28, 2010 (KR) ........................ 10-2010-0072719

(51) Int. Cl.
*H04N 7/169* (2011.01)
*G06K 9/00* (2006.01)

(52) U.S. Cl.
USPC ........... 380/205; 380/201; 380/206; 380/207; 380/209; 382/100

(58) Field of Classification Search
USPC ........... 380/201, 205, 206, 207, 209; 382/100
See application file for complete search history.

(56) References Cited

U.S. PATENT DOCUMENTS

| 7,840,005 | B2 * | 11/2010 | Delp et al. | 380/201 |
|---|---|---|---|---|
| 8,483,429 | B2 * | 7/2013 | Murakami | 382/100 |
| 2002/0172395 | A1 * | 11/2002 | Foote et al. | 382/100 |
| 2003/0123660 | A1 * | 7/2003 | Fletcher et al. | 380/205 |
| 2006/0210108 | A1 * | 9/2006 | Brunk et al. | 382/100 |
| 2009/0060257 | A1 * | 3/2009 | Lee et al. | 382/100 |
| 2011/0299723 | A1 * | 12/2011 | Ohira | 382/100 |

OTHER PUBLICATIONS

Baha'a A-Deen et al, "Improving Invisibility of Blind Video Watermarking Scheme", Dec. 11-12, 2007, IEEE 1-4233-1470-9/07/.*

* cited by examiner

*Primary Examiner* — Krisna Lim
(74) *Attorney, Agent, or Firm* — Rabin & Berdo, P.C.

(57) ABSTRACT

A composite masking system and method for improving the invisibility of high-definition video watermarking. The composite masking system includes a watermark generation module, a mask generation module, and watermark embedment means. The watermark generation module generates a basic watermark pattern using a private key, and generate a watermark pattern by repeatedly extending the basic watermark pattern. The mask generation module generates a Noise Visibility Function (NVF) mask using NVF masking means, an adaptive dithering mask using adaptive dithering masking means, and a contour mask using contour masking means. The watermark embedment means generates a composite mask by multiplying the NVF mask, the adaptive dithering mask and the contour mask together, multiplying the composite mask and the extended watermark pattern together, and embedding the result of the second multiplication in the luminance channel of an original image.

12 Claims, 9 Drawing Sheets

|   |   |   |   |   |
|---|---|---|---|---|
| 1 | β(0,1) | 1 | β(0,3) | 1 |
| β(1,0) | 1 | β(1,2) | 1 | β(1,4) |
| 1 | β(2,1) | 1 | β(2,3) | 1 |
| β(3,0) | 1 | β(3,2) | 1 | β(3,4) |
| 1 | β(4,1) | 1 | β(4,3) | 1 |

Width: $M_2 \cdot k$
Height: $M_1 \cdot k$

COMPOSITE MASKING SYSTEM AND METHOD FOR IMPROVING INVISIBILITY OF HIGH-DEFINITION VIDEO WATERMARKING

CROSS-REFERENCE TO RELATED PATENT APPLICATION

This application claims the benefit under 35 U.S.C. §119 to Korean Patent Application No. 10-2010-0072719, filed on Jul. 28, 2010, in the Korean Intellectual Property Office, the disclosure of which is incorporated herein in its entirety by reference.

BACKGROUND OF THE INVENTION

1. Field of the Invention

The present invention relates generally to a composite masking system and method for improving the invisibility of high-definition video watermarking and, more particularly, to technology that can improve the perceptual quality of a video into which a watermark has been embedded using a composite mask, including a Noise Visibility Function (NVF) mask, an adaptive dithering mask and a contour mask, which takes into consideration a Human Visual System (HVS).

2. Description of the Related Art

With the growth of the infrastructure and industry related to digital video content, illegitimate copies and distributions of video content have increased because they can be easily processed, delivered and stored.

Since such illegitimate acts result in great financial harm to content providers and the related market, video watermarking has become important as a digital right management system.

As an alternative, there is a method of tracking an illegitimately reproduced copy back to the receiver from which it originated, using a technique for imperceptibly inserting a signal, including the copyright information of the invisible video watermark, into the original video content.

Recently, the popularization of high-resolution video content requires such a video watermarking system to meet several requirements: invisibility, robustness, and real-time processing. First, a watermark embedded in video content should be imperceptible by a human observer. The higher the quality of video content, the more important is invisibility. Second, high-resolution video content is generally manipulated several different times so that it can be adapted to a variety of display devices, such as an LCD TV, a portable multimedia player, and a high-performance mobile phone. In a practical situation, the manipulations mostly include downscaling, trans-coding into various formats, and frame rate conversion. Detection of the embedded watermark should be reliable in spite of major manipulations. Finally, the computational expense of video watermarking should be low. A real-time video watermarking system is especially required for the protection of high-quality video on-demand (VOD) services.

Each element of a watermark pattern that is to be embedded should be repeatedly expanded so that it can be reliably detected in a watermarked video even when scaled to a small size. However, reinforcing the low frequency of the extended pattern causes block artifacts, resulting in deterioration in the invisibility of the embedded watermark pattern.

Figure 1:
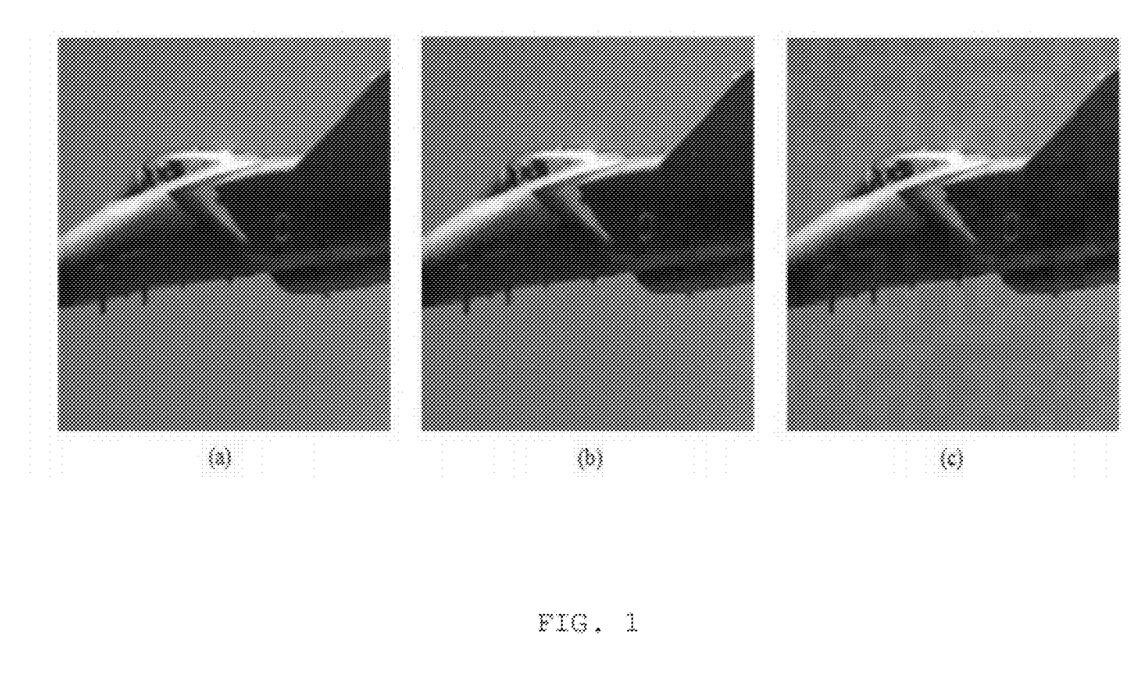
FIG. 1 is a view showing a comparison of the visibility depending on the extension of a watermark pattern.

FIG. 1(a) is an original image, FIG. 1(b) is an image in which a pattern which has not been extended has been embedded, and FIG. 1(c) is an image in which an 8 times extended pattern has been embedded. As shown in FIGS. 1(a) to 1(c), the block artifacts are clearly shown in the case of being extended 8 times. Although the peak signal-to-noise ratios (PSNR) of FIG. 1(b) and FIG. 1(c) are equally 38 dB, it is obvious that the watermark invisibility of FIG. 1(c) is lower.

In order to solve the block artifact problem, a method using dithering masking was proposed. However, in this method, all watermark patterns of the embedded regions are dithered by masking by an equal amount without considering the property of the cover work, and therefore there is a limit as to how much the watermark embedding strength can be controlled and consequently the performance of the imperceptibility decreases.

Meanwhile, hitherto a noise visibility function (NVF) masking based on an HVS has been utilized. According to the NVF, the watermark can be embedded more strongly in contour or texture regions than in flat regions.

However, contour or edge regions are more sensitive to noise addition than texture regions but less so than flat regions according to the HVS, and thus the traditional masks such as the NVF mask have the problem of not distinguishing between the contour region and the high texture region. If the traditional mask is used directly, the contour region can be easily corrupted and it results in severe distortions to the video.

SUMMARY OF THE INVENTION

Accordingly, the present invention has been made keeping in mind the above problems occurring in the prior art, and an object of the present invention is to provide a composite masking system and method for improving the invisibility of high-definition video watermarking, which is capable of solving a block artifact problem by extending a basic watermark pattern using an adaptive dithering mask so as to provide robustness against various downscaling attacks.

Another object of the present invention is to provide a composite masking system and method for improving the invisibility of high-definition video watermarking, which is capable of compensating for the disadvantage of the NVF mask not distinguishing between the texture region and the edge and contour regions using the contour mask.

In order to accomplish the above objects, the present invention provides a composite masking system for improving the invisibility of high-definition video watermarking, including a watermark generation module for generating a basic watermark pattern using a private key and generating a watermark pattern by repeatedly extending the basic watermark pattern in order to improve the robustness against scaling attacks as well as general video processing attacks; a mask generation module for generating a Noise Visibility Function (NVF) mask using NVF masking means, an adaptive dithering mask using adaptive dithering masking means, and a contour mask using contour masking means; and watermark embedment means for generating a composite mask by multiplying the NVF mask, the adaptive dithering mask and the contour mask together, multiplying the composite mask and the extended watermark pattern together, and embedding the result of the second multiplication in the luminance channel of an original image.

Additionally, the present invention provides a composite masking method for improving the invisibility of high-definition video watermarking, comprising steps of (a) a watermark generation module generating a watermark pattern to be embedded using a private key, generated by a private key generator, and a spread spectrum watermarking technique; (b) a mask generation module generating an NVF mask, an adaptive dithering mask and a contour mask to be embedded in a Y channel of an original image; and (c) a watermark embedment module generating a composite mask by multiplying the NVF mask, the adaptive dithering mask and the contour mask together, multiplying the generated composite mask and the watermark pattern together, and embedding the result of the second multiplication in the luminance channel of the original image.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Terms and words used in the present specification and the accompanying claims should be interpreted as having meanings and denoting concepts that are in conformity with the technical spirit of the present invention on the basis of the principal in which an inventor can appropriately define the concepts of terms in order to best describe his or her invention. It should be noted that in the following description, when it is determined that detailed descriptions of well-known functions related to the present invention and configurations thereof would make the gist of the present invention obscure, they will be omitted.

Figure 2:
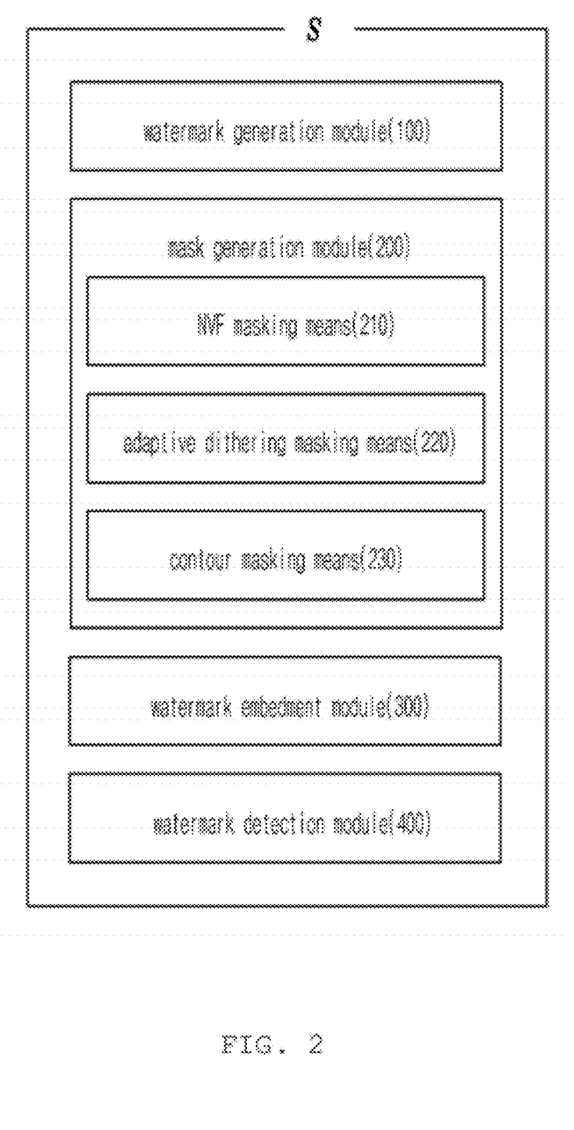
FIG. 2 is a diagram showing the configuration of a composite masking system for improving the invisibility of high-definition video watermarking according to the present invention.

As shown in FIG. 2, a composite masking system S for improving the invisibility of high-definition video watermarking according to the present invention includes a watermark generation module 100, a mask generation module 200, a watermark embedment module 300, and a watermark detection module 400.

Figure 3:
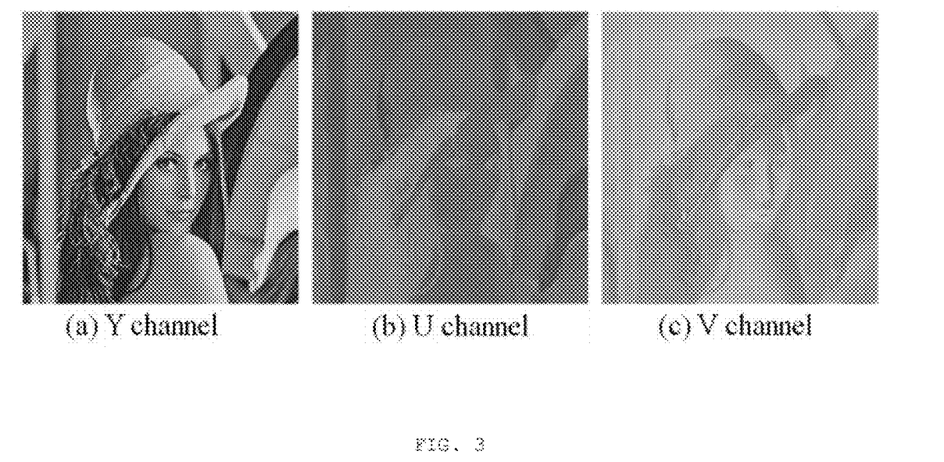
FIG. 3 is a view showing the Y, U and V channels of an original image to be used in the contour masking step of the composite masking system for improving the invisibility of high-definition video watermarking according to the present invention.

Although a description thereof will be omitted below, it is assumed that a watermark for the composite masking system S for improving the invisibility of high-definition video watermarking according to the present invention is embedded in a Y channel selected from among the Y channel which is a luminance signal, a U channel which is the difference between the luminance signal and a blue component, and a V channel which is the difference between the luminance signal and a red component, as shown in FIG. 3.

First, the watermark generation module 100 generates a basic watermark pattern w with a size of $M_1 \times M_2$ based on a private key, and then generates an extended watermark pattern W to be embedded using a spread spectrum watermarking technique.

In detail, the watermark generation module 100 generates a watermark pattern W to be embedded by repeatedly extending the basic pattern w k times in the vertical and horizontal directions in order to improve the robustness against a scaling attack as well as general video processing attacks. Consequently, the size of the watermark pattern W to be embedded is $M_1 \cdot k \times M_2 \cdot k$.

Meanwhile, the mask generation module 200 generates an NVF mask $\alpha$, an adaptive dithering mask $\beta$ and a contour mask $\gamma$ to be embedded in the Y channel of an original image using NVF masking means 210, adaptive dithering masking means 220 and contour masking means 230.

First, the NVF masking means 210 obtains the NVF mask using the following Equation 1:

$$\alpha(i,j) = ((1 - nvf(i,j)) \cdot S_0 + nvf(i,j) \cdot S_1 \tag{1}$$

where $S_0$ is the upper bound of edged and texture regions and $S_1$ is the lower bound of visibility of flat and smooth regions.

In Equation 1, nvf is expressed by Equation 2:

$$nvf(i, j) = \frac{1}{1 + (D/\sigma_{max}^2) \cdot \sigma^2(i, j)} \tag{2}$$

where D is a scaling constant and $\sigma_{max}^2$ is the maximum of a local variance.

Figure 4:
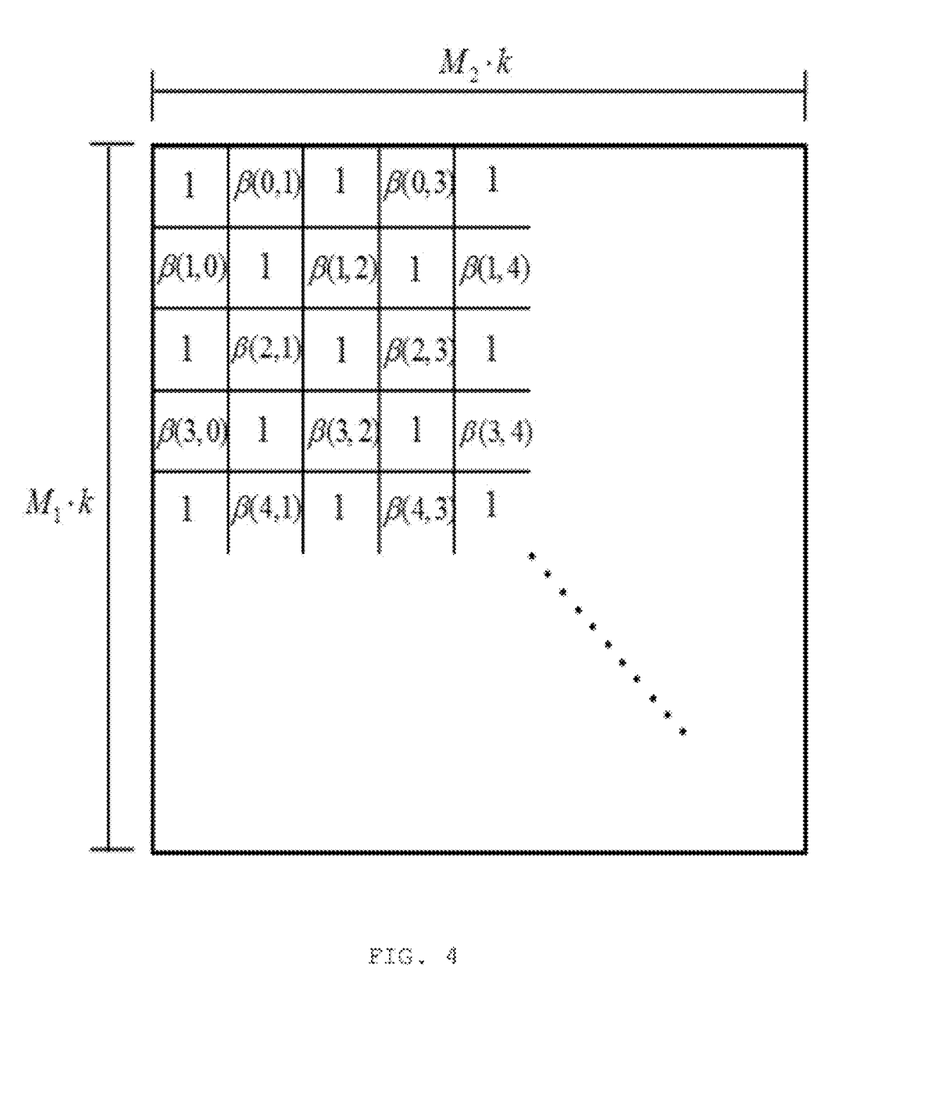
FIG. 4 is a drawing showing the elements of the adaptive dithering mask of the composite masking system for improving the invisibility of high-definition video watermarking according to the present invention.

The adaptive dithering masking means 220 generates the adaptive dithering mask $\beta$ using the following Equation 3, and the components of the adaptive dithering mask $\beta$ are shown in FIG. 4:

$$\beta(i, j) = \begin{cases} \frac{\alpha(i,j) - S_1}{S_0 - S_1} \cdot (B_{max} - B_{min}) + B_{min}, & \text{if } i + j = \text{odd} \\ 1, & \text{if } i + j = \text{even} \end{cases} \tag{3}$$

where $B_{max}$ and $B_{min}$ are the maximum and minimum boundaries, respectively, and the range thereof is $0 \leq B_{min} < B_{max} \leq 1$. The variable value $\beta(i, j)$ is close to $B_{min}$ in the flat area, and $B_{max}$ in the edge or high texture area.

Since the block artifacts in high activity regions are less perceptible to human vision than in flat regions, it is efficient that the dithering to be more weakly performed in high activity regions that in flat regions on the basis of the adaptive dithering mask.

Figure 5:
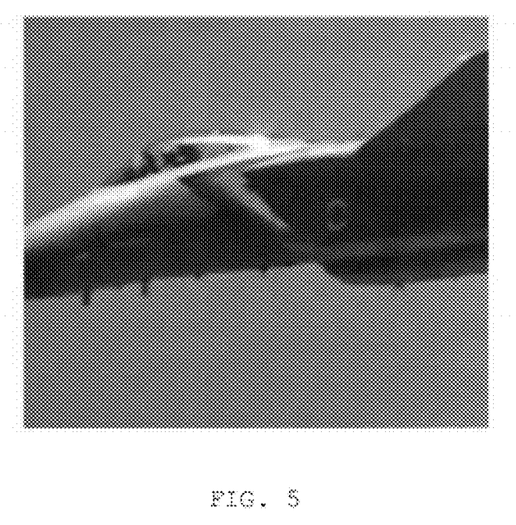
FIG. 5 is a view showing an image in which an 8 times extended watermark pattern has been embedded in the image of FIG. 1(a) after adaptive dithering according to the composite masking system for improving the invisibility of high-definition video watermarking according to the present invention.

Furthermore, FIG. 5 is the result in which the 8 times extended watermark has been embedded in the still image of FIG. 1(a) after adaptive dithering masking. This drawing illustrates that there are fewer block artifacts compared to FIG. 1(c).

The contour masking means 230 generates the contour mask γ which separates the contour or edge regions from the results of the NVF mask so as to compensate for the disadvantage of the NVF masking not distinguishing between the contour and high texture regions.

Figure 6:
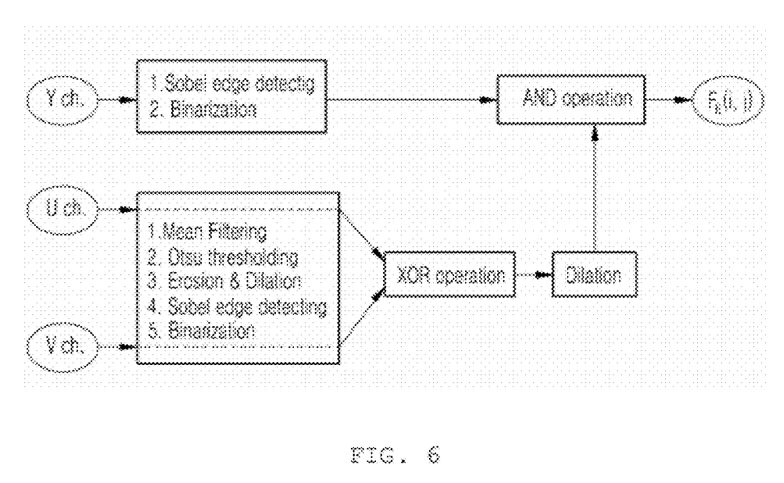
FIG. 6 is a diagram showing the procedure for obtaining the contour mask of the composite masking system for improving the invisibility of high-definition video watermarking according to the present invention.

The mask is obtained by a composite operation at Y, U, and V channels. In the case of general video decoders, the size of the U or V channel should be scaled up to the size of the Y channel because the size of the Y channel is greater than that of the U and V channels. After scaling, in the case of the U or V channel, the following process is performed.

First, the noisy and high activity regions are suppressed by a mean filter. The binarization result composed of 0 and 255 is obtained by an Otsu thresholding method.

Thereafter, the contour masking means 230 removes a partially remaining high activity area using erosion and dilation operations as morphological algorithms, calculates the gradient of the morphological result using a Sobel edge detector, and then binarizes the magnitude of the gradient into 0 or 1. The results of U and V channels are denoted by $U_E$ and $V_E$, respectively. Finally, the combined result $C_E$ is obtained by an inclusive OR operation between $U_E$ and $V_E$. In order to clarify the $C_E$, dilation operation is applied and the result is denoted by $C_{ED}$.

Meanwhile, in the case of the Y channel, the gradient of the Y channel is obtained by a Sobel edge detector and then normalized to a range of 0 to 255.

The contour masking means 230 binarizes the normalization result into 0 or 1 using an Otsu thresholding method, denotes the binarization result using $Y_E$, and represents edge and high textured regions. As shown in FIG. 6, the contour or edge region result $F_E$ is approximated by an AND logical operation between $Y_E$ and $C_{ED}$.

The above-described contour mask γ of the contour masking means 230 is obtained by the following Equation 4:

$$\gamma(i,j) = 1 - F_E(i,j) \times m \quad (4)$$

where m is a weight factor and is empirically set to 0.5. Since $F_E$ is composed of 0 and 1, $0 < \gamma(i,j) \le 1$ according to m. In other words, γ(i, j) is 1 in the flat or high active region, and the value between 0 and 1 in the contour or the edge region.

Figure 7:
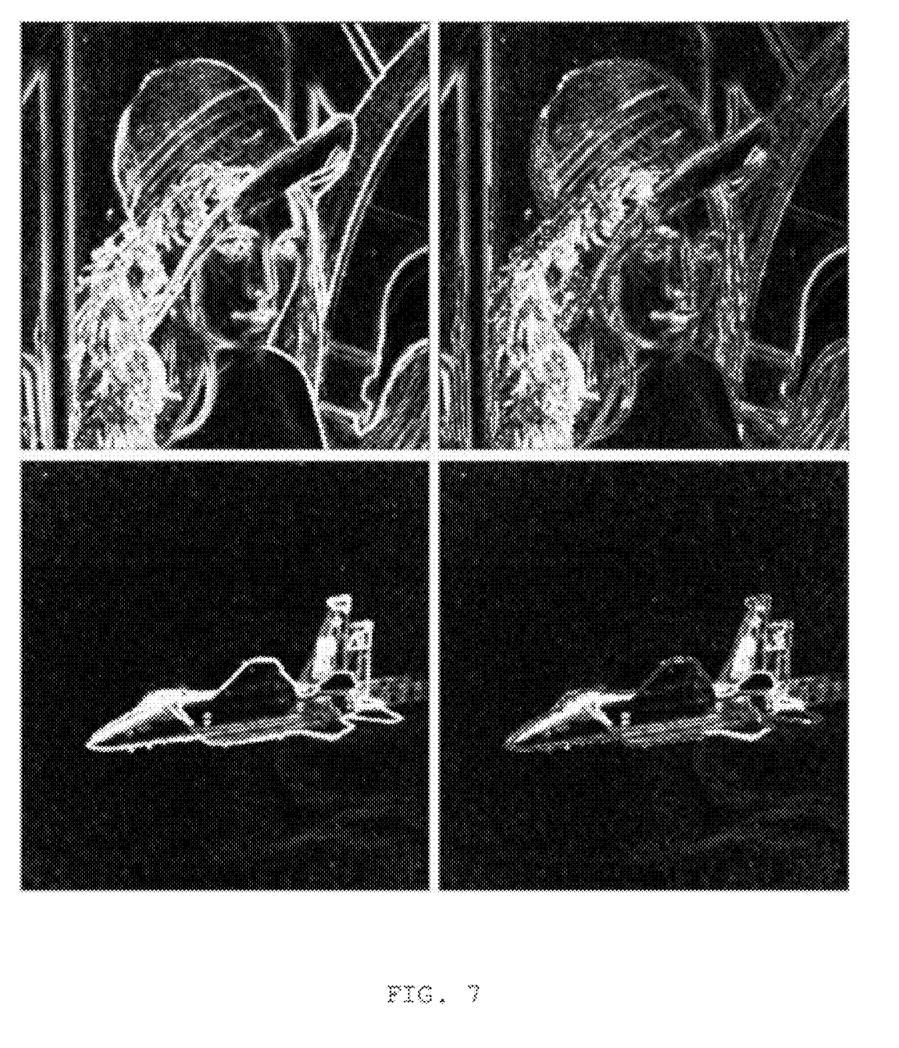
FIG. 7 is a view showing the performance of the contour masking of the composite masking system for improving the invisibility of high-definition video watermarking according to the present invention, wherein left images are images to which only an NVF mask has been applied, and right images are images to which both an NVF mask and a contour mask have been applied.

FIG. 7 is a diagram showing the performance of the contour masking in the composite masking system for improving the invisibility of high-definition video watermarking according to the present invention, wherein left images are images to which only an NVF mask has been applied and right images are images to which both an NVF mask and a contour mask have been applied.

As shown in FIG. 7, the results in which the contour or edge region of the contour mask generated by the contour masking means 230 and die NVF mask generated by the NVF masking means 210 have been applied both become dim compared to only NVF masking results. This means that the strength with which a watermark is embedded in the contour or edge region is weaker than in the texture region. Therefore, the strength of the embedding of a watermark in the contour or edge region can be controlled by the obtained contour mask.

Meanwhile, the watermark embedment means 300 generates a composite mask by multiplying the NVF mask α, the adaptive dithering mask β and the contour mask γ generated by the mask generation module 200, and embeds the watermark pattern to which the composite mask γ has been applied in the luminance channel of an original image using the following Equation 5:

$$Y'(i, j) = \quad (5)$$
$$Y(i,j) + \lambda(i, j) \cdot W(i, j) = Y(i, j) + \alpha(i, j) \cdot \beta(i, j) \cdot \gamma(i, j) \cdot W(i, j)$$

where Y' is the inserted luminance channel of a frame, (i, j) is the spatial coordinates within the watermarking Region Of Interest (ROI), Y is the luminance channel of the frame, λ is a composite mask, including the NVF mask α, the adaptive dithering mask β and the contour mask γ, and w is the watermark pattern.

Meanwhile, the watermark detection module 400 detects the watermark pattern embedded in the image using an adaptive Wiener filter as a de-noising filter. The watermark is estimated from each frame of the watermarked image, and is accumulated over a preset time to increase the accuracy of the estimated watermark.

Thereafter, the watermark detection module 400 computes the normalized correlation between the accumulated estimation result and the original watermark generated by the secret key after the accumulation for the preset time. If the correlation value exceeds a preset threshold, it is determined that the hidden messages have been correctly extracted. Here, the preset threshold value is determined using an approximate Gaussian method.

Figure 8:
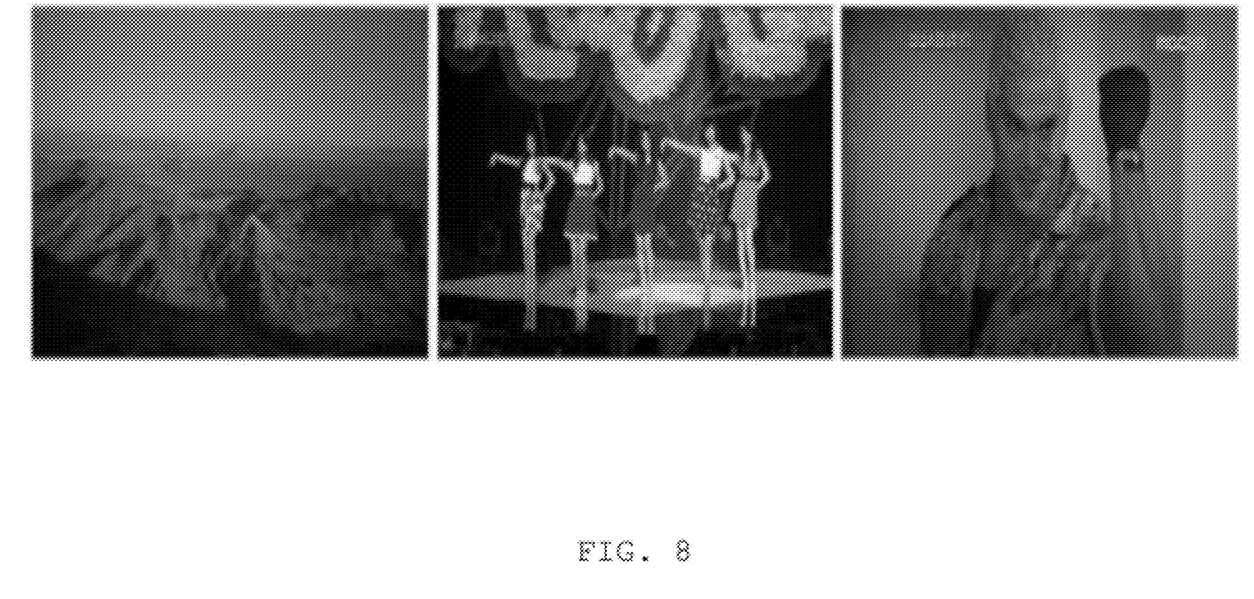
FIG. 8 is a view showing test video images which are used to measure the invisibility, robustness and real-time performance of the composite masking system for improving the invisibility of high-definition video watermarking according to the present invention.

The results of measuring the fidelity, robustness and real-time performance of the composite masking system S for improving the invisibility of high-definition video watermarking according to the present invention, which were obtained from the videos of FIG. 8, are as follows:

The above measurement results were obtained from three MPEG-2 Full-HD resolution (1920×1080) videos, which were 40 seconds in length and 30 fps in frame rate, from various genres, as shown in FIG. 8.

The accumulative time for the correlation was 2 seconds and the size of the watermark pattern, which was embedded into the center of each video frame, was 288×288 by repeatedly expanding a 48×48 basic watermark pattern 6 times in the vertical and horizontal direction. The parameter D in Equation 2 and $S_0$, $S_1$, $B_{min}$, and $B_{max}$ in Equation 3 were set to 150, 4, 1, 0.15, and 0.85, respectively.

[Invisibility Test]

The average PSNR and the average wPSNR are used as objective measures. The wPSNR is closer to perception than the PSNR. The wPSNR which reflects the HVS can be calculated by the following equations:

$$n(i, j) = \frac{S_0 - \alpha(i, j) \cdot \gamma(i, j)}{S_0} \quad (6)$$

$$wMSE = \frac{1}{M_1 \cdot k \times M_2 \cdot k} \sum_i^{M_1 \cdot k} \sum_j^{M_2 \cdot k} (Y'(i, j) - Y(i, j))^2 \cdot n(i, j)$$

$$wPSNR = 10 \log_{10}\left(\frac{225^2}{wMSE}\right)$$

The invisibility of the present invention was compared with the traditional masking method using only the NVF mask. For the sake of fairness of the test, the watermark embedding strength of the both cases is evenly coordinated. In addition, the quality of the watermarked videos was subjectively evaluated using the ITU-R Rec. 500-11 quality rating scale. The test involved ten participants who were familiar with the details of the watermark algorithm and were able to detect visual artifacts. The test videos were displayed on a Samsung PAVV 650 LCD TV in a room at a brightness of 101×. Also, the watermarked videos were viewed from a distance of five times the height of the LCD screen according to the preferred viewing distance rule of the ITU-R Rec. 500-11.

TABLE 1

|  |  | Genre | | |
| --- | --- | --- | --- | --- |
|  | Method | Documentary | Show | Action movie |
| PSNR(dB) | proposed mask | 47.8 | 47.1 | 48.3 |
|  | traditional mask | 47.7 | 46.8 | 47.9 |
| wPSNR(dB) | proposed mask | 50.7 | 50.2 | 50.9 |
|  | traditional mask | 48.2 | 47.8 | 48.4 |
| Subjective score | proposed mask | 4.5 | 4.7 | 4.6 |
|  | traditional mask | 3.9 | 4.3 | 4.0 |

Table 1 shows the test results. The PSNR and wPSNR are the results in the ROI region. Although PSNR results between both methods are similar, wPSNR and subjective test results prove that the proposed masking method produces higher invisibility than the traditional masking method.

[Robustness Test]

To evaluate the robustness of the watermarking method using the proposed composite mask according to the present invention, robustness tests were performed on the videos, which were watermarked at the embedding strength used in the above invisibility test.

The present test focuses on the robustness of the watermarking system against combined attacks that are commonly used on high quality videos in practice. The combined attacks include arbitrary-ratio downscaling, trans-coding to MPEG-4, and frame rate conversion from 30 fps to 24 fps.

TABLE 2

|  | Genre | | |
| --- | --- | --- | --- |
| Attack | Documentary | Show | Action movie |
| 1280*720 + composite attack | 0.41 | 0.47 | 0.39 |
| 640*480 + composite attack | 0.32 | 0.36 | 0.33 |
| 480*360 + composite attack | 0.30 | 0.31 | 0.28 |
| 320*180 + composite attack | 0.21 | 0.22 | 0.25 |

Table 2 shows the results in the form of normalized correlations. Multiple attacks mean the frame rate conversion and the trans-coding. The threshold of 0.09 satisfies a false positive error probability of 10-8. All correlation values sufficiently exceed the threshold. Although the results of the traditional case using only an NVF mask are not described in this table, the results are almost the same as those of the proposed method. The test results imply that the proposed watermarking method using the presented masking is robust against various downscaling attacks as well as common signal processing manipulations.

[Real-Time Performance Test]

The proposed method was implemented using the Intel integrated performance primitives library and tested on Intel® Core2 Duo CPU 2.0 GHz, 2 GB RAM. In general, three sub-functions for decoding video streams, embedding or detecting watermarks, and displaying marked video should be processed at 0.03 sec/frame for a real-time watermarking system.

The process time of the watermarking algorithm is important because the process times of decoding and displaying are constant. Table 3 shows the processing time results of Full-HD videos. The time unit is seconds. These results prove that the proposed masking method is very simple, and consequently the watermarking system has real-time performance.

TABLE 3

|  | Decoding time | Watermarking process time | Display time | Total time |
| --- | --- | --- | --- | --- |
| Embedment | 0.0112 | 0.0095 | 0.0038 | 0.0245 |
| Detection |  | 0.0012 |  | 0.0162 |

The above-described composite mask according to the present invention is a video watermarking scheme that maintains invisibility in spite of the extension of watermark pattern to provide robustness against scaling attacks.

This composite mask is built by multiple operations of adaptive dithering mask, contour mask, and NVF mask, which consider HVS. The above-described test results show that the proposed method is good at the invisibility of the embedded watermark while it still makes the video watermarking system robust to various scaling attacks as well as common video processing manipulations and maintains real-time performance.

Meanwhile, the composite masking method for improving the invisibility of video watermarking according to the present invention will be described with reference to FIGS. 9 and 10.

Figure 9:
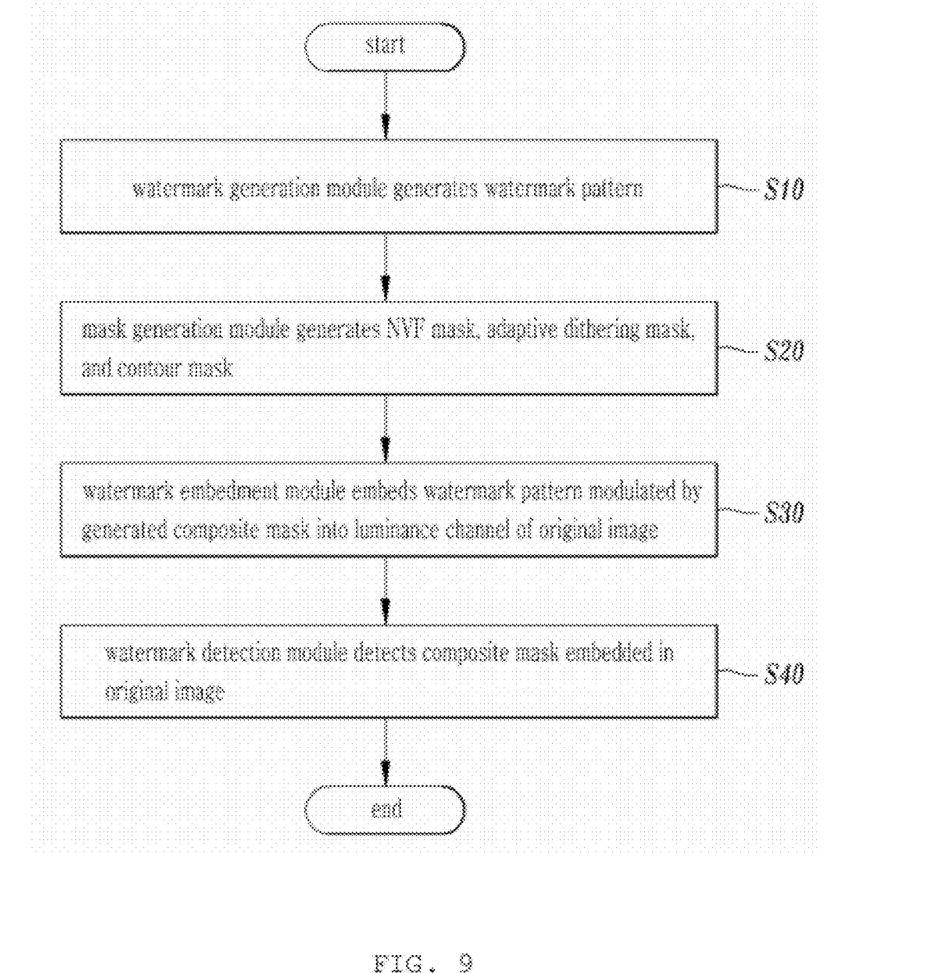
FIG. 9 is a flowchart showing a composite masking method of improving the invisibility of high-definition video watermarking according to the present invention.
Figure 10:
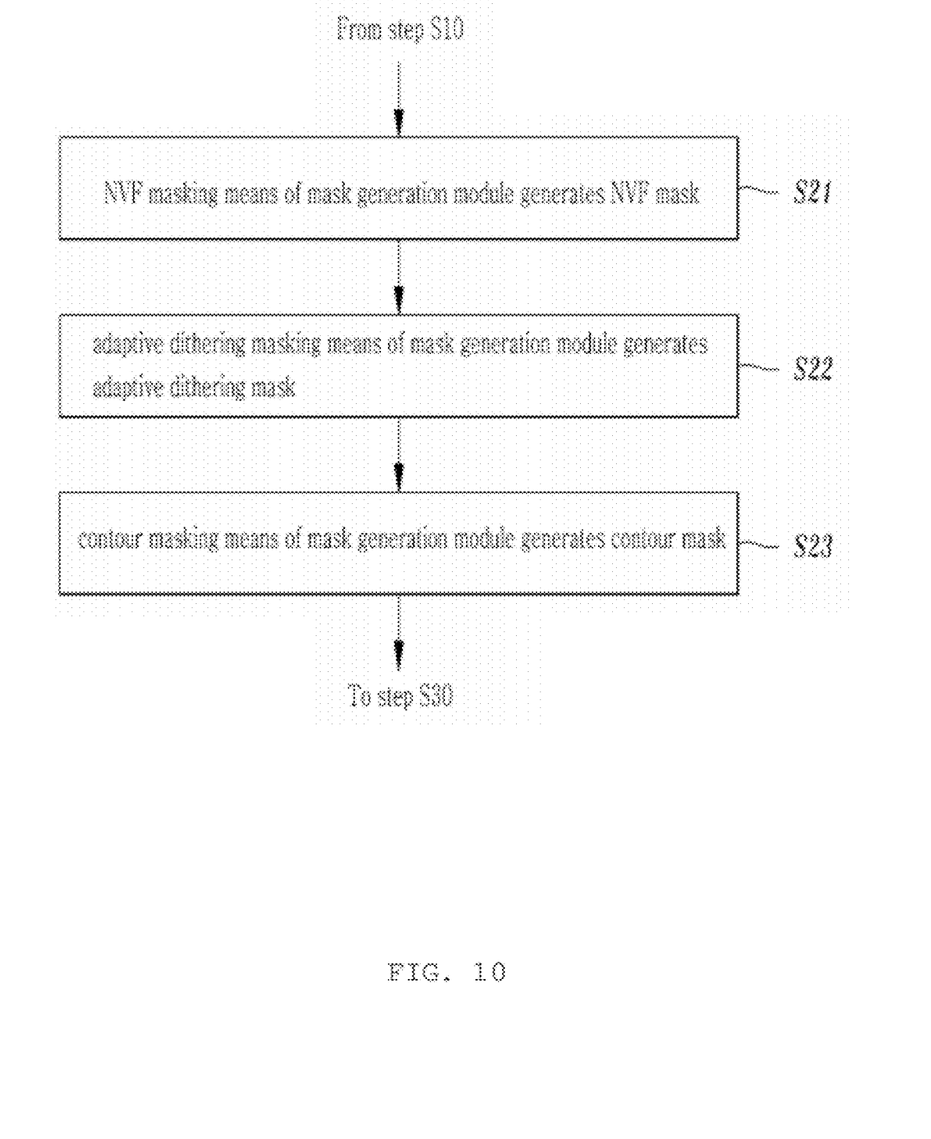
FIG. 10 is a flowchart showing the detailed process of step S20 of the composite masking method of improving the invisibility of high-definition video watermarking according to the present invention.

Referring to FIG. 9, the watermark generation module 100 generates a watermark pattern to be embedded using a spread spectrum watermarking technique and a private key, generated by a private key generator, at step S10.

Thereafter, the mask generation module 200 generates an NVF mask $\alpha$, an adaptive dithering mask $\beta$ and a contour mask $\gamma$ at step S20.

Thereafter, the watermark embedment module 300 generates a composite mask by multiplying the NVF mask $\alpha$, the adaptive dithering mask $\beta$ and the contour mask $\gamma$ generated by the mask generation module 200, and embeds a watermark pattern to which the generated composite mask has been applied in the luminance channel of the original image at step S30.

Furthermore, the watermark detection module 400 detects the watermark pattern from the watermarked image to which the composite mask has been applied using an adaptive Wiener filter at step S40.

Step S20 of the composite masking method for improving the invisibility of video watermarking according to the present invention will be described in detail below with reference to FIG. 10.

First, the NVF masking means 210 of the mask generation module 200 generates the NVF mask $\alpha$ using Equations 1 and 2 at step 21.

Thereafter, the adaptive dithering masking means 220 of the mask generation module 200 generates the adaptive dithering mask $\beta$ using Equation 3 at step S22.

Thereafter, the contour masking means 230 of the mask generation module 200 generates the contour mask $\gamma$ using the process of FIG. 6 and Equation 4 at step S23.

The present invention has the advantage of solving the block artifact problem by extending a basic watermark pattern using the adaptive dithering mask so as to provide robustness against various downscaling attacks.

Furthermore, the present invention has the advantage of compensating for the disadvantage of the NVF mask not distinguishing between the texture region and the edge and contour regions using the contour mask.

Moreover, the present invention has the advantage of not only performing general video processing but also improving invisibility while providing robustness against downscaling and maintaining real-time performance, using the composite mask including the NVF mask, the adaptive dithering mask and the contour mask.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A composite masking system for improving invisibility of high-definition video watermarking, comprising:
   a watermark generation module for generating a basic watermark pattern using a private key and generating a watermark pattern by repeatedly extending the basic watermark pattern in order to improve the robustness against scaling attacks as well as general video processing attacks;
   a mask generation module for generating a Noise Visibility Function (NVF) mask using NVF masking means, an adaptive dithering mask using adaptive dithering masking means, and a contour mask using contour masking means; and
   watermark embedment means for generating a composite mask by multiplying the NVF mask, the adaptive dithering mask and the contour mask together, multiplying the composite mask and the extended watermark pattern together, and embedding a result of the second multiplication in a luminance channel of an original image.

2. The composite masking system as set forth in claim 1, wherein the watermark generation module generates the watermark pattern by repeatedly extending the basic pattern k times in vertical and horizontal directions in order to improve robustness against scaling attacks as well as general video processing attacks.

3. The composite masking system as set forth in claim 2, wherein a size of the basic watermark pattern is $M_1 \times M_2$ and a size of the watermark pattern is $M_1 \cdot k \times M_2 \cdot k$.

4. The composite masking system as set forth in claim 1, wherein the NVF masking means generates the NVF mask using Equations (1) and (2):

$$\alpha(i,j) = ((1-nvf(i,j)) \cdot S_0 + nvf(i,j) \cdot S_1 \quad (1)$$

where $S_0$ is an upper bound of edged and texture regions and $S_1$ is a lower bound of visibility of flat and smooth regions, and $$nvf(i,j) = \frac{1}{1 + (D/\sigma_{max}^2) \cdot \sigma^2(i,j)} \quad (2)$$

where D is a scaling constant and $\sigma_{max}^2$ is a maximum of a local variance.

5. The composite masking system as set forth in claim 1, wherein the adaptive dithering masking means generates the adaptive dithering mask using Equation (3):

$$\beta(i,j) = \begin{cases} \frac{\alpha(i,j) - S_1}{S_0 - S_1} \cdot (B_{max} - B_{min}) + B_{min}, & \text{if } i+j = \text{odd} \\ 1, & \text{if } i+j = \text{even} \end{cases} \quad (3)$$

where $B_{max}$ and $B_{min}$ are maximum and minimum boundaries, respectively, a range thereof is $0 \leq B_{min} < B_{max} \leq 1$, and a variable value $\beta(i,j)$ is close to $B_{min}$ in a flat area and $B_{max}$ in an edge or high texture area.

6. The composite masking system as set forth in claim 1, wherein the contour masking means generates the contour mask by separating contour and edge regions of the watermark pattern, in a case of a Y channel, the contour masking means obtaining a gradient of the Y channel using a Sobel edge detector, normalizing the gradient to a range of 0 to 255, binarizing a result of the normalization into 0 or 1 using an Otsu thresholding method, representing edge and high textured regions, and approximating the regions using an AND logical operation.

7. The composite masking system as set forth in claim 1, wherein the contour masking means generates the contour mask by separating contour and edge regions of the watermark pattern, the contour masking means suppressing noisy and high activity regions of U and V channels using a mean filter, obtaining a binarization result composed of 0 and 255 using an Otsu thresholding method, removing a partially remaining high activity area using erosion and dilation operations as morphological algorithms, calculating a gradient of a morphological result using a Sobel edge detector, binarizing a magnitude of the gradient into 0 or 1, denoting results of U and V channels using $U_E$ and $V_E$, respectively, obtaining a combined result using an inclusive OR operation between $U_E$ and $V_E$, and, in order to clarify the combined result, applying a dilation operation to the combined result and denoting the combined result using $C_{ED}$.

8. The composite masking system as set forth in claim 1, wherein the watermark embedment means generates the composite mask by multiplying the NVF mask, the adaptive dithering mask and the contour mask, and multiplying the composite mask and the watermark pattern by each other and then embedding a result of this multiplication in the luminance channel of the original image, as shown in Equation 5:

$$Y'(i,j) = \quad (5)$$
$$Y(i,j) + \lambda(i,j) \cdot W(i,j) = Y(i,j) + \alpha(i,j) \cdot \beta(i,j) \cdot \gamma(i,j) \cdot W(i,j)$$

where Y' is the inserted luminance channel of a frame, and (i, j) is spatial coordinates within a watermarking Region Of Interest (ROI).

9. The composite masking system as set forth in claim 1, further comprising a watermark detection module for detecting the watermark pattern embedded in the image using an adaptive Wiener filter as a de-noising filter.

10. A composite masking method for improving invisibility of high-definition video watermarking, comprising steps of:
   (a) a watermark generation module generating a watermark pattern to be embedded using a private key, generated by a private key generator, and a spread spectrum watermarking technique;

(b) a mask generation module generating an NVF mask, an adaptive dithering mask and a contour mask to be embedded in a Y channel of an original image; and (c) a watermark embedment module generating a composite mask by multiplying the NVF mask, the adaptive dithering mask and the contour mask together, multiplying the generated composite mask and the watermark pattern together, and embedding a result of the second multiplication in a luminance channel of the original image.

11. The composite masking method as set forth in claim 10, further comprising, after step (c), a step of:

(d) a watermark detection module detecting the watermark pattern embedded in the watermarked image using an adaptive Wiener filter as a de-noising filter.

12. The composite masking method as set forth in claim 10, wherein step (b) comprises steps of:

(b-1) NVF masking means of the mask generation module generating the NVF mask using Equations (1) and (2);

(b-2) adaptive dithering masking means of the mask generation module generating the adaptive dithering mask using Equation (3); and (b-3) contour masking means of the mask generation module generating the contour mask using Equation (4):

$$\alpha(i,j) = ((1 - nvf(i,j)) \cdot S_0 + nvf(i,j) \cdot S_1 \tag{1}$$

where $S_0$ is an upper bound of edged and texture regions and $S_1$ is a lower bound of visibility of flat and smooth regions, $$nvf(i,j) = \frac{1}{1 + (D/\sigma_{max}^2) \cdot \sigma^2(i,j)} \tag{2}$$

where D is a scaling constant and $\sigma_{max}^2$ is a maximum of a local variance, $$\beta(i,j) = \begin{cases} \frac{\alpha(i,j) - S_1}{S_0 - S_1} \cdot (B_{max} - B_{min}) + B_{min}, & \text{if } i + j = \text{odd} \\ 1, & \text{if } i + j = \text{even} \end{cases} \tag{3}$$

where $B_{max}$ and $B_{min}$ are maximum and minimum boundaries, respectively, a range thereof is $0 \leq B_{min} < B_{max} \leq 1$, and a variable value $\beta(i,j)$ is close to $B_{min}$ in a flat area and $B_{max}$ in an edge or high texture area, and $$\gamma(i,j) = 1 - F_E(i,j) \times m \tag{4}$$

where m is a weight factor and is empirically set to 0.5, and $F_E$ is composed of 0 and 1.

* * * * *